Patented July 29, 1952

2,605,192

UNITED STATES PATENT OFFICE 2,605,192

RAIN REPELLENT COATING COMPOSITION

Thomas P. May, Washington, D. C., and Oid Davis Shreve, Chapel Hill, N. C.

No Drawing. Original application June 7, 1944, Serial No. 539,178. Divided and this application April 7, 1945, Serial No. 587,194

2 Claims. (Cl. 106—173)

(Granted under the act of March 3, 1883, as amended April 30, 1928; 370 O. G. 757)

This application is a division of our abandoned application, Serial No. 539,178, filed June 7, 1944, which is a continuation in part of our abandoned application, Serial No. 488,940, filed May 28, 1943.

Our invention relates to moisture-repellent coatings, and it is particularly concerned with a rain-repellent coating composition and a method of coating windshields and other optical surfaces exposed to the weather with a moisture-repellent composition.

It is commonly appreciated that water when it strikes most surfaces spreads out into a more or less continuous film. This is due to the fact that most commonly encountered surfaces are somewhat hydrophilic, that is to say, they are fairly readily wettable by water. The ability of water to wet surfaces becomes a distinctly annoying property when it wets transparent surfaces, such as windshields of airplanes. There are other military applications where water films offer serious difficulty as, for example, the viewing faces of submarine periscopes. Aircraft in flight often encounter rain and fog which cloud up windows and windshields.

Water not only is troublesome in optical applications but also offers great difficulty in various electrical applications. Wherever high voltages are used, parts are mounted on stand-off insulators which depend for their effectiveness upon giving a current a long, rough ride in creating a break-down. When high-voltage stand-off insulators are used in aircraft, sudden changes in altitudes produce marked temperature and humidity changes within the aircraft, condensation of moisture takes place on parts, and often spectacular break-downs occur. Elaborate precautions have been taken against such contingencies by pressurizing equipment, heating equipment, and separating parts.

From a consideration of those optical and electrical problems so common in aircraft, it became apparent to us that the same solution could be applied in both cases because in both cases the action is a surface phenomenon and continuous films of water cause the trouble. Many waterproofing compositions are available for waterproofing permeable materials, but that is not the problem which it was our object to solve. Our problem is a peculiar mixture of electrical and chemical in that both electrical and chemical surface phenomena are involved. As we have stated, the problem is not to waterproof a surface, for the surfaces we propose to treat are inherently waterproof; glass and the plastic material used as windshields in automobiles and aircraft are certainly waterproof in the sense in which the term is ordinarily used, as are also most of the ceramic insulators encountered in electrical apparatus. However, practically all surfaces of the classes we propose to treat are wettable by water.

It is an object of our invention to provide a method of treating various wettable but substantially water-impervious surfaces to make them non-wettable by water.

It is another object of our invention to provide certain novel compositions for coating optical surfaces to make the surface non-wettable yet not adversely affect the optical properties of the material.

It is another object of our invention to provide a composition for coating surfaces of electrical insulators to make them non-wettable.

It is another object of our invention to provide a composition which when applied to high-voltage insulating surfaces will withstand the peak voltage to which the insulator will be subjected.

It is another object of our invention to provide a novel film composition which will form a relatively hard, tack-free, and attractive surface easily maintained by repeated application.

Other objects and advantages of our invention will in part be obvious and in part appear hereinafter.

Our invention comprises a novel film-forming composition possessing such a degree of transparency, electrical resistance, non-wettability, and durability that it can be used to put substantially invisible, long-lasting, non-wettable films on aircraft windshields. Its electrical resistance is such that it can also be used to coat electrical insulators with a non-wettable film to prevent their break-down by condensation of moisture thereon. In the following description of our invention, we propose not only to describe how our film-forming composition is formulated but also how we think its electrical characteristics accentuate its value as a coating material for optical surfaces.

In their studies of surface phenomena physical chemists have adopted a method of defining the wettability of a surface by a liquid. A drop of the liquid under study is allowed to rest on the surface whose wettability by the liquid is being measured and the "contact angle" of the liquid is determined. The contact angle as we use the term throughout this specification is the angle of inclination of a tangent to the drop at its point of contact with the surface, this angle being measured from the surface to the tangent through the drop. A surface is considered wettable when this angle is less than 90°. This is reasonable for it is not hard to picture a small film of limited extent as a very flat drop. A surface is not considered wettable if the contact angle exceeds 90°. This again is quite reasonable for it is easy to see that if the contact angle exceeds 90°, the liquid droplet will tend to roll rather than spread.

In our opinion it is an essential characteristic of a rain-repellent film that it make the surface to which it is applied form a contact angle greater than 90° with the liquid which it is desired to prevent from wetting the surface. If the contact angle is less than 90°, a breeze of any strength will tend to make the droplet flatten out. If the angle is greater than 90°, the breeze will make the droplet roll. Since it is the object of our invention to clear windshields of moisture, obviously it is necessary that our films cause water to form with them an angle greater than 90°.

It is our belief that the better the electrical-insulating properties of the film, the better its non-wettable character. It is well known that aircraft in their swift flight will pick up strong static charges particularly if the atmosphere through which they are flying contains particles of solid or liquid such as snow, hail, dust, or rain. To a limited extent such a charge on the windshield, if the windshield is a good insulator, will be helpful in that the windshield will not permit a large leakage current to flow over it and, by retaining a substantial charge, will help disperse drops finely by exploding them as they strike the surface.

It has been found from experience that a continuous film of water over a transparent surface will interfere seriously with visibility, particularly if the film is in motion, for the ripples and waves in the surface of a moving film seriously impair visibility. It has also been found that large discrete drops on a windshield also seriously impair visibilty. When the drop size is below about one millimeter, visibility is not seriously affected.

From the above considerations, it is clear that the ideal non-wettable film would be one that would make water droplets form a contact angle greater than 90°; it would retain enough static charge to keep droplets broken up finely; and it would be durable. In an aircraft or other vehicle the wind would take care of the rest by sweeping the surface free of the droplets which, by virtue of their having high contact angles, should roll off quickly.

Although it is relatively easy to analyze the problem of preparing non-wettable films for optical and insulating surfaces and to set up the properties of the ideal film, it is found that the formula of a usable composition is as evasive as a will-o-the-wisp. Film-forming materials having individual properties meeting one or the other of the requirements are common, but none has the required combination of desired properties.

The composition of our invention comprises three essential ingredients to give it the necessary film-forming and electrical properties, namely, a film-forming component, an adhesive which usually is also a plasticizer, and a hydrophobic material to give the film the property of making high contact angles with water. In preparing the composition for application to a transparent surface through which undistorted vision must be maintained, a solvent or mixture of several solvents is used such that the composition will dry to form a smooth, uniform, non-blushing, and transparent coating.

This introduces the very rigorous requirement that the components must be compatible with each other in solution and through all stages of the drying. For other applications in which transparency of the film is not important, the composition and solvent can deviate from those given below. To achieve good results the solvent must be selected to give a reasonably fast-drying time without causing separation of the solid materials, and the relative proportions of the solid materials must also be selected to give a clear and uniformly smooth coating.

The preparation of insulating and non-wettable film-forming compositions, according to our invention and their use will be clearly understood from the following example:

*Example*

A mixture of 3.3 parts of nitrocellulose (30-second type sold by Hercules Powder Co.), 12 parts of glycerol ester of hydrogenated rosin and 0.45 part of solid polyisobutylene (average molecular weight 5000 or greater) were dissolved to form a clear solution in 85 parts butyl acetate.

It is possible to vary the formulation of this coating composition by using 3.0 to 6.0 parts nitrocellulose (any nitrocellulose of low or intermediate viscosity commonly used in lacquers, soluble in esters and ester-alcohol mixtures), 10 to 14 parts glycerol ester of hydrogenated rosin (or rosin, hydrogenated rosin or polyhydric alcohol ester of rosin or hydrogenated rosin) and 0.2 to 1.0 part of polyisobutylene or paraffin. The amount of solvent can be varied to suit the formulator. However, about 85 parts, as mentioned above, gives a solution of convenient viscosity. In all formulations for coating windshields and optical surfaces, it is essential that the ingredients be compatible and remain compatible during the entire drying time to avoid any blushing or separation of phases on the treated surface. The above composition was tested, together with variations of it, in a rainmaking device for standardization and in flight tests. The rainmaking device consisted of a pane of glass mounted inclined at an angle of 45°, a blower and a spray. The blower and spray were arranged to send air and water against the glass at a rate corresponding to a rainfall of 4.0 inches per hour in a 40-mile per hour gale. In all cases it stood up well; in the rainmaking device it lasted 5-6 hours in a continuous storm of rain, striking it at the rate of 4.0 inches per hour in a 40-mile per hour gale.

Since it is contemplated that the film is to be applied to optical surfaces and it would require good electrical properties for that purpose, it is hardly necessary to cite experimental data for its use in coating insulators. It was found that these films developed for optical surfaces, in general, were excellent film formers for electrical insulators. The parts were coated by dipping or by brushing. For application to flat surfaces a squeegee made of lintless material spreads it on in good fashion. The compositions all formed transparent, tough, durable films when permitted to dry for about an hour after application.

A few general properties of the compositions were brought out above and are summarized below:

The film-forming ingredients should all be compatible in solution and during the entire drying period.

The ingredients recommended above are compatible in the ranges given and, for purposes of this composition, are equivalents of each other. That is, the polyisobutylene of the example can be replaced by paraffin. Rosin, hydrogenated rosin, or a polyhydric alcohol ester of rosin can be used.

The solvent selected should be one which will dry without blushing. Where the coating is not to be used on optical surfaces, this is not necessary and need not be observed strictly. It must not affect the surface to which it is applied, and it must be fairly rapid drying.

The film-forming ingredient, nitrocellulose, should leave a durable film after the solvent evaporates.

The hydrophobic contact angle raising ingredient should be completely compatible with the other materials used; for coating optical surfaces it must be transparent.

Films made according to the formulae given and suggested in the example were deposited on glass surfaces, and the surfaces, as indicated in the example, repelled rain. Similar films were deposited on glass and plastic surfaces and soaked by immersion in water. Within 72 hours in every case the films had soaked off. Similarly some matches and wooden surfaces were coated and immersed in water. In these cases, the films soaked loose in a matter of an hour or two, yet, in the case of the wooden surfaces, when exposed to rain the coated surfaces repelled water. Apparently the surfaces are water repellent without being waterproof in the sense of being impermeable to water or water vapor. As we have pointed out in the early part of our description of our invention, we contemplate treating surfaces like glass and plastics or ceramic insulating surfaces which are inherently impermeable to water. The permeability of our films to water is, therefore, no disadvantage for the films themselves show the desired degree of water repellency.

Since many apparently different embodiments of this invention may be made without departing from the spirit and scope thereof, it is to be understood that we do not limit ourselves to the specific embodiments thereof except as defined in the appended claims.

The invention described herein may be manufactured and used by or for the Government of the United States of America for governmental purposes without the payment of any royalties thereon or therefor.

Having described our invention what we claim as new and desire to secure by Letters Patent is:

1. A composition capable of drying to form a water-repellent film consisting essentially of from about 3 to about 6 parts of nitrocellulose, from about 10 to about 14 parts of the glyceryl ester of hydrogenated rosin and from about 0.2 to about 1 part of a hydrophobic material selected from the group consisting of polyisobutylene of 5000 average molecular weight, paraffin and ceresin in solution in butyl acetate.

2. A composition capable of drying to form a water-repellent film consisting essentially of from about 3 to 6 parts of nitrocellulose, from about 10 to 14 parts of the glyceryl ester of hydrogenated rosin and from about 0.2 to about 1 part of paraffin in solution in butyl acetate.

THOMAS P. MAY.
OID DAVIS SHREVE.

REFERENCES CITED

The following references are of record in the file of this patent:

UNITED STATES PATENTS

| Number | Name | Date |
|---|---|---|
| 1,737,187 | Charch et al. | Nov. 26, 1929 |
| 1,826,696 | Charch et al. | Oct. 6, 1931 |
| 1,884,553 | Bradley | Oct. 25, 1932 |
| 1,940,462 | Nollan | Dec. 19, 1933 |
| 2,085,816 | Meigs | July 6, 1937 |
| 2,122,418 | Gladding et al. | July 5, 1938 |
| 2,181,609 | Russell | Nov. 28, 1939 |
| 2,305,497 | Rummelsburg | Dec. 15, 1942 |

FOREIGN PATENTS

| Number | Country | Date |
|---|---|---|
| 459,344 | Great Britain | Jan. 6, 1937 |

OTHER REFERENCES

"Commercial Waxes," Bennett, 1944, p. 71.
"The Chemistry and Technology of Waxes," Warth, 1947, pp. 211, 212 and 287.